United States Patent
Kawahara (10) Patent No.: US 10,484,562 B2
(45) Date of Patent: Nov. 19, 2019

(54) IMAGE FORMING APPARATUS, CONTROL PROGRAM, AND METHOD FOR CONTROLLING LUMINANCE OF THE IMAGE FORMING APPARATUS

(71) Applicant: SHARP KABUSHIKI KAISHA, Sakai, Osaka (JP)

(72) Inventor: Hisashi Kawahara, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/243,627

(22) Filed: Jan. 9, 2019

(65) Prior Publication Data

US 2019/0149682 A1    May 16, 2019

Related U.S. Application Data

(62) Division of application No. 15/662,588, filed on Jul. 28, 2017, now Pat. No. 10,225,424.

(30) Foreign Application Priority Data

Jul. 29, 2016    (JP) .................... 2016-149126

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ..... *H04N 1/00891* (2013.01); *H04N 1/00323* (2013.01); *H04N 1/00411* (2013.01); *H04N 1/00896* (2013.01); *H04N 2201/0089* (2013.01); *H04N 2201/0094* (2013.01)

(58) Field of Classification Search
CPC .......... H04N 1/00891; H04N 1/00323; H04N 1/00411; H04N 1/00896; H04N 2201/0089; H04N 2201/0094
USPC ....................... 358/1.1, 1.13, 1.15
See application file for complete search history.

(56) References Cited

U.S. PATENT DOCUMENTS

| | | | |
|---|---|---|---|
| 10,225,424 B2* | 3/2019 | Kawahara | H04N 1/00323 |
| 2011/0296163 A1 | 12/2011 | Abernethy et al. | |
| 2012/0154307 A1 | 6/2012 | Nunomaki | |
| 2013/0258424 A1* | 10/2013 | Ono | H04N 1/00323 358/475 |
| 2015/0261168 A1* | 9/2015 | Yokoyama | G03G 15/80 399/81 |
| 2016/0219174 A1* | 7/2016 | Umeda | H04N 1/00891 |

FOREIGN PATENT DOCUMENTS

| | | |
|---|---|---|
| CN | 102326133 A | 1/2012 |
| CN | 102568433 A | 7/2012 |

\* cited by examiner

*Primary Examiner* — Douglas Q Tran
(74) *Attorney, Agent, or Firm* — ScienBiziP, P.C.

(57) ABSTRACT

An image forming apparatus includes a display, a human detection sensor, and a CPU. If the CPU determines that there is a person in a certain area with the display in an off state, the display enters a first on state in accordance with an instruction from the CPU. If the CPU determines that the image forming apparatus has been operated, the display enters a second on state.

6 Claims, 8 Drawing Sheets

| DISPLAY STATE | OFF STATE | FIRST ON STATE | SECOND ON STATE |
|---|---|---|---|
| FIRST OPERATION MODE | POWER SAVING MODE | POWER SAVING MODE | NORMAL MODE |
| SECOND OPERATION MODE | POWER SAVING MODE | NORMAL MODE | NORMAL MODE |
| THIRD OPERATION MODE | FIRST POWER SAVING MODE | SECOND POWER SAVING MODE | NORMAL MODE |

IMAGE FORMING APPARATUS, CONTROL PROGRAM, AND METHOD FOR CONTROLLING LUMINANCE OF THE IMAGE FORMING APPARATUS

BACKGROUND

1. Field

The present disclosure relates to an image forming apparatus, a control program, and a method for controlling the image forming apparatus.

2. Description of the Related Art

Japanese Unexamined Patent Application Publication No. 2015-195548 discloses an image forming apparatus in an example of the related art. The image forming apparatus includes a detection unit that detects a person approaching the image forming apparatus and, if the detection unit detects a person approaching the image forming apparatus in a power saving state, activates a function unit with a display unit remaining in an off state. With the image forming apparatus, if the person who has approached the image forming apparatus presses a power saving key or touches a touch panel after the function unit is activated, the display unit enters an on state.

SUMMARY

With the image forming apparatus in the example of the related art, even if a person (user) approaches the image forming apparatus, the display unit remains in the off state until the user instructs the display unit to enter the on state. When the display unit remains in the off state like this even if the user approaches the image forming apparatus, the user might think that the image forming apparatus has not been activated (has not been turned on) or has gone wrong. That is, the user might not appropriately recognize that the image forming apparatus has been activated.

In order to make the user appropriately recognize that the image forming apparatus has been activated, for example, the display unit may enter the on state if there is a person in front of or near the image forming apparatus. In this case, however, the display unit undesirably enters the on state even while a person who does not use the image forming apparatus is just passing by the image forming apparatus. The display unit might frequently enter the on state even while the image forming apparatus is not used, and give passersby unpleasant or uncomfortable feelings. In addition, power supplied to the image forming apparatus is also not appropriately controlled.

The present disclosure provides an image forming apparatus, a control program, and a method for controlling the image forming apparatus.

The present disclosure also provides an image forming apparatus, a control program, and a method for controlling the image forming apparatus capable of making the user appropriately recognize that the image forming apparatus has been activated.

A first aspect of the present disclosure is an image forming apparatus including a display unit, a presence determination unit that determines whether there is a person in an area set around the image forming apparatus, an operation determination unit that determines whether the image forming apparatus has been operated, and a light controlling unit that, if the presence determination unit determines that there is a person in the area with the display unit in an off state, establishes a first on state, in which luminance of the display unit becomes equal to or lower than a certain value, and if the operation determination unit determines that the image forming apparatus has been operated with the display unit in the first on state, establishes a second on state, in which the luminance of the display unit becomes higher than in the first on state.

A second aspect of the present disclosure is a control program for an image forming apparatus including a display unit. The control program causes a computer of the image forming apparatus to function as a presence determination unit that determines whether there is a person in an area set around the image forming apparatus, an operation determination unit that determines whether the image forming apparatus has been operated, and a light controlling unit that, if the presence determination unit determines that there is a person in the area with the display unit in an off state, establishes a first on state, in which luminance of the display unit becomes equal to or lower than a certain value, and if the operation determination unit determines that the image forming apparatus has been operated with the display unit in the first on state, establishes a second on state, in which the luminance of the display unit becomes higher than in the first on state.

A third aspect of the present disclosure is a method for controlling an image forming apparatus including a display unit. A computer of the image forming apparatus performing operations includes (a) determining whether there is a person in an area set around the image forming apparatus, (b) determining whether the image forming apparatus has been operated, and (c) establishing, if it is determined in (a) that there is a person in the area with the display unit in an off state, a first on state, in which luminance of the display unit becomes equal to or lower than a certain value, and establishing, if it is determined in (b) that the image forming apparatus has been operated with the display unit in the first on state, a second on state, in which the luminance of the display unit becomes higher than in the first on state.

DESCRIPTION OF THE EMBODIMENTS

First Embodiment

Figure 1:
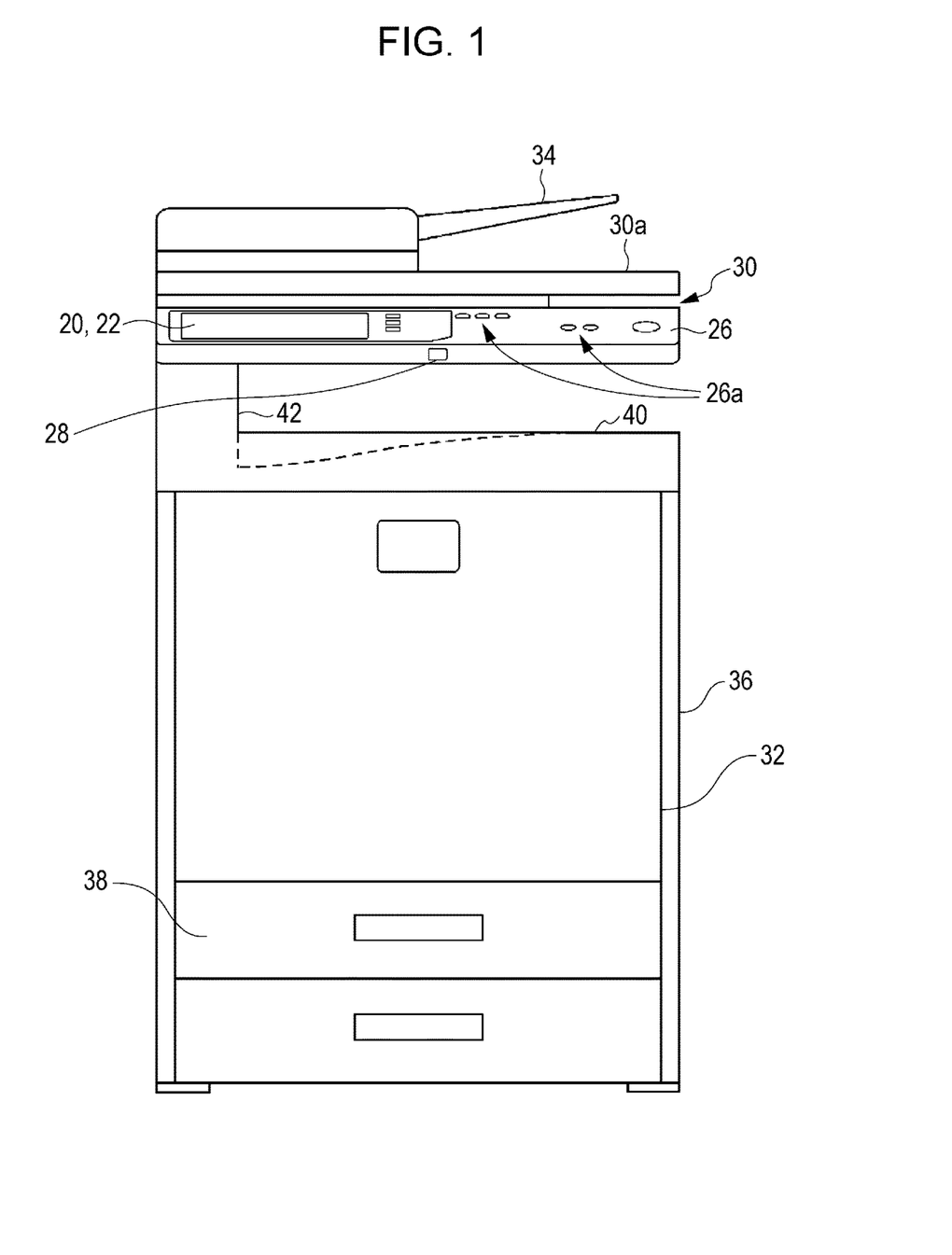
FIG. 1 is a front view illustrating the appearance of an image forming apparatus according to a first embodiment of the present disclosure.

FIG. 1 is a front view illustrating the appearance of an image forming apparatus 10 according to a first embodiment of the present disclosure. As illustrated in FIG. 1, in the first embodiment, the image forming apparatus 10 is a multi-functional peripheral (MFP) having a copier function, a printer function, a scanner function, a facsimile function, and the like. The present disclosure can be applied not only to an MFP but also to other image forming apparatuses such as copying machines (copiers), printing apparatuses (printers), and facsimiles.

The image forming apparatus 10 includes an apparatus body 36 including an image reading unit 30, an image forming unit 32, a manual-bypass unit 34, a paper feeder 38, and a paper output tray 40.

The image reading unit 30 includes a platen formed of a transparent material and included in the apparatus body 36. A document cover 30a is movably attached on the platen through a hinge or the like. The manual-bypass unit 34 is provided for the document cover 30a. An automatic document feeder (ADF) that automatically feeds a document set in the manual-bypass unit 34 is also provided for the document cover 30a.

The image reading unit 30 includes a light source, a plurality of mirrors, an imaging lens, and a line sensor. The image reading unit 30 radiates light onto a surface of a document using the light source and leads the light reflected from the surface of the document to the imaging lens through the plurality of mirrors. The reflected light then goes to light reception devices included in the line sensor through the imaging lens. In the line sensor, the light reception devices detect the luminance or the chroma of the reflected light to generate image data based on an image of the surface of the document. The line sensor may be a charge-coupled device (CCD), a contact image sensor (CIS), or the like.

The image forming unit 32 is included in the apparatus body 36 and provided under the image reading unit 30. The image forming unit 32 includes a photosensitive drum, a charging device, an exposure device, a developing device, a transfer device, and a fixing device. The image forming unit 32 forms an image on a recording medium (sheet) conveyed from the manual-bypass unit 34, the paper feeder 38, or the like using an electrophotographic method and outputs the sheet on which the image has been formed to the paper output tray 40. Image data to be used to form an image on a sheet may be image data read by the image reading unit 30, image data transmitted from an external computer, or the like. The recording medium is not limited to a sheet of paper and may be a sheet that is not made of paper, such as an overhead projector (OHP) film.

The paper output tray 40 is provided between the image reading unit 30 and the image forming unit 32. A bottom surface of the paper output tray 40 is defined by the image forming unit 32. A top surface of the paper output tray 40 is defined by the image reading unit 30. A left-side surface (left-side viewed from the front) of the paper output tray 40 is defined by a right-side surface of a connecting part 42. A front surface, a back surface, and a right-side surface of the paper output tray 40 are open. The bottom surface of the paper output tray 40 is inclined downward toward the connecting part 42.

An operation panel 26 is provided on a front surface of the image reading unit 30. The operation panel 26 includes a display (display unit) 22 with a touch panel 20 and a plurality of operation buttons 26a.

The display 22 with the touch panel 20 displays software keys, messages, and the like for receiving various settings, printing instructions, and the like from the user. In an example, the display 22 displays a home screen for enabling the user to select a desired job from various jobs that can be performed by the image forming apparatus 10. In the first embodiment, however, a job refers to copying includes scanning of a document), printing, fax, or the like.

The operation buttons 26a are hardware keys and include, for example, a home key, a power saving key, and a power key. The home key is used to display the home screen on the display 22. The power saving key is used to switch between a power saving state (power saving mode), in which power consumption is reduced, and a normal state (normal mode), in which power consumption is not reduced.

In the power saving mode, for example, power is supplied to the touch panel 20, the operation buttons 26a, a human detection sensor 28, the manual-bypass unit 34, and the like. In the power saving mode, power is also supplied to a central processing unit (CPU) 12, a RAM 14, a touch panel control circuit 16, an operation button detection circuit 24, a communication circuit 44 (refer to FIG. 2), and the like that will be described later. In the power saving mode, however, the power consumption of the image forming apparatus 10 is reduced to a predetermined value (e.g., several percent of maximum power consumption) or smaller. Types and the number of components to which power is supplied in the power saving mode, therefore, are determined in consideration of the predetermined value and the power consumption of the components.

If the power saving key is pressed, the mode used switches from the normal mode to the power saving mode, or from the power saving mode to the normal mode. The power key is used to turn on or off the image forming apparatus 10.

The software keys refer to, for example, keys provided on the display 22 with the touch panel 20 in a software manner. The hardware keys, on the other hand, refer to keys (buttons) provided as physical equipment.

The human detection sensor 28 for detecting a person located in front of or near the apparatus body 36 is provided at the center of a front surface of the operation panel 26.

Figure 2:
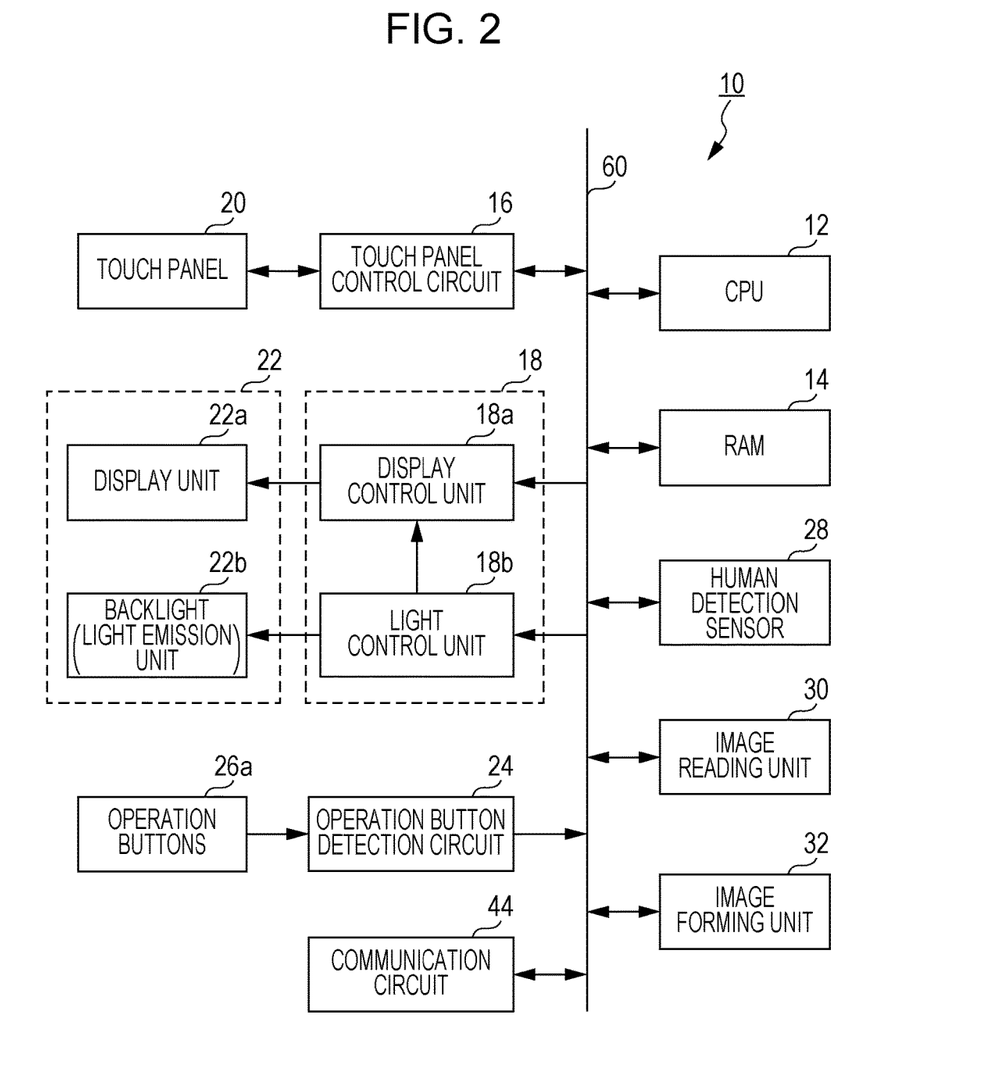
FIG. 2 is a block diagram illustrating the electrical configuration of the image forming apparatus illustrated in FIG. 1.

FIG. 2 is a block diagram illustrating the electrical configuration of the image forming apparatus 10. As illustrated in FIG. 2, the image forming apparatus 10 includes the CPU 12. The RAM 14, the touch panel control circuit 16, a display control circuit 18, the operation button detection circuit 24, the human detection sensor 28, the image reading unit 30, the image forming unit 32, and the communication circuit 44 are connected to the CPU 12 through a bus 60. The touch panel 20 is connected to the touch panel control circuit 16, the display 22 is connected to the display control circuit 18, and the operation buttons 26a are connected to the operation button detection circuit 24.

The CPU 12 controls the entirety of the image forming apparatus 10. The RAM 14 is used as a working area and a buffer area of the CPU 12.

The touch panel control circuit. 16 gives an appropriate voltage to the touch panel 20, detects a touch operation (touch input) within a touch effective area of the touch panel 20, and outputs touch coordinate data indicating a position of the touch input to the CPU 12.

The touch panel 20 is a general-purpose touch panel and may be of any type such as a capacitive type, an electromagnetic induction type, a resistive film type, or an infrared type. In the first embodiment, a touch panel of a capacitive type is used as the touch panel 20, and the touch panel 20 is provided on the display 22. Alternatively, a touch panel display in which the touch panel 20 and the display 22 are integrated together may be used.

The display control circuit 18 includes a display control unit 18a and a light control unit 18b. The display control unit 18a includes a graphics processing unit (GPU) and video RAM (VRAM). The GPU generates, in the VRAM, display image data for displaying various screens on the display 22 using image generation data stored in the RAM 14 and outputs the generated display image data to the display 22 in accordance with instructions from the CPU 12. The light control unit 18b turns on and off a backlight (corresponds to a light emission unit) 22b of the display 22, which will be described later, in accordance with instructions from the CPU 12. That is, the CPU 12 controls the light control unit 18b such that the display 22 is illuminated or not illuminated. The display control circuit 18 controls the luminance (brightness) of the display 22, details of which will be described later.

The display 22 is a liquid crystal display (LCD) or an electroluminescent (EL) display. In the first embodiment, the display 22 is an LCD and includes a liquid crystal panel (display unit) 22a and the backlight 22b.

The liquid crystal panel 22a is provided on a front surface of the display 22. In the liquid crystal panel 22a, a space between two transparent boards is filled with liquid crystal. When voltage is applied, the orientation of liquid crystal molecules changes and light transmittance accordingly changes.

The backlight (light emission unit) 22b includes light sources such as light-emitting diodes (LEDs) or fluorescent lights and illuminates the liquid crystal panel 22a from the back. If an EL display is used as the display 22, a light emission layer of the EL display corresponds to the liquid crystal panel 22a and the backlight 22b.

The operation button detection circuit 24 outputs an operation signal or operation data corresponding to an operation performed on the operation buttons 26a to the CPU 12.

The human detection sensor 28 is, for example, a distance sensor for detecting whether there is a person (user) in area A (refer to FIG. 3) set in front of the image forming apparatus 10. An infrared sensor, an ultrasonic sensor, a laser distance sensor, or the like is used as the distance sensor. The distance sensor outputs distance data to the CPU 12. The CPU 12 determines, on the basis of whether a distance indicated by distance data output from the human detection sensor 28 is equal to or shorter than a certain value, which defines area A, whether there is a person (user) in front of the image forming apparatus 10. Area A, therefore, can be seen as an area set to determine whether there is a person in front of the image forming apparatus 10.

A pyroelectric sensor, a floor sensor (pressure sensor), or the like may be used as the human detection sensor 28 instead of the distance sensor. When a pyroelectric sensor is used, the pyroelectric sensor detects a change in temperature in area A, and the CPU 12 determines whether there is a person in area A in accordance with an output of the pyroelectric sensor. When a floor sensor is used, the floor sensor is provided in an area corresponding to area A of the image forming apparatus 10, and the CPU 12 determines whether there is a person in area A in accordance with an output of the floor sensor.

Figure 3:
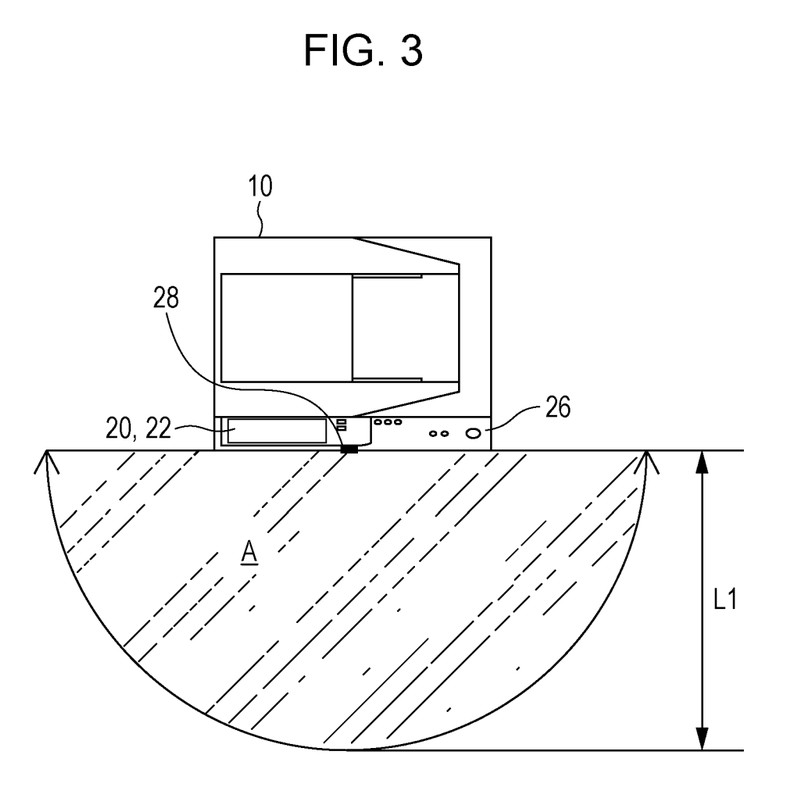
FIG. 3 is a plan view illustrating an area set in front of the image forming apparatus.
Figure 4:
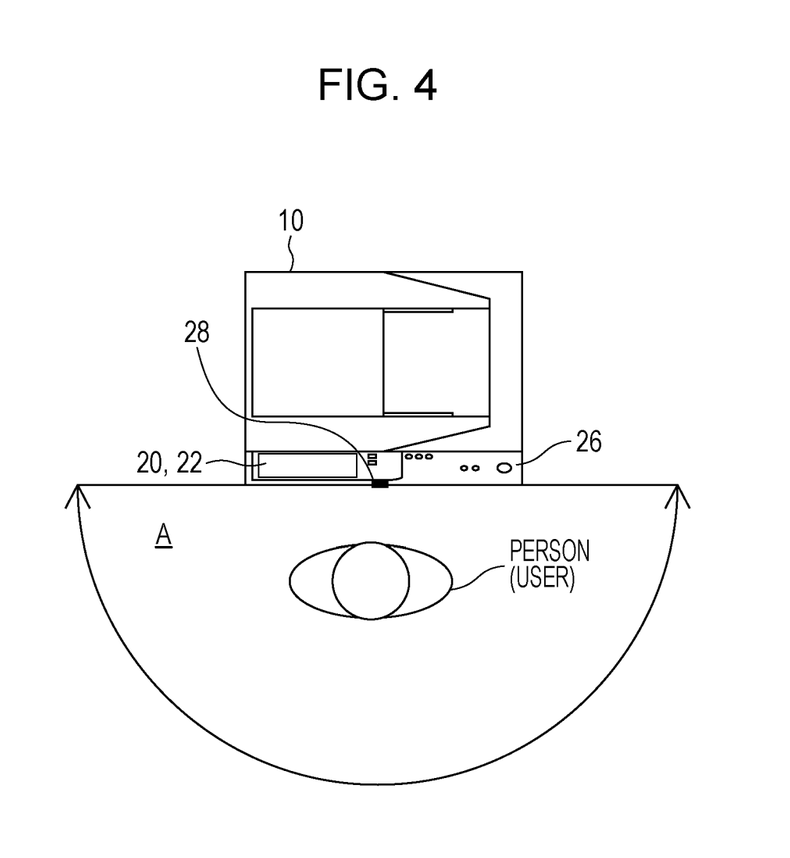
FIG. 4 is a plan view illustrating a case in which there is a person in the area.

FIG. 3 is a plan view illustrating area A set in front of the image forming apparatus 10. FIG. 4 is a plan view illustrating a case in which there is a person in area A.

As illustrated in FIG. 3, area A is an area in which a person who might use (operate) the image forming apparatus 10 exists. In an example, area A is defined by a semicircle whose radius is a first distance L1. The first distance L1 is a horizontal distance from the center of a front surface of the apparatus body 36 of the image forming apparatus 10 and, in the first embodiment, equal to or longer than a distance between the center of the front surface of the apparatus body 36 and a left or right edge of the front surface of the apparatus body 36. That is, in the first embodiment, area A is an area in front of the image forming apparatus 10 (apparatus body 36) in which a person who can operate the image forming apparatus 10 (e.g., a person who can reach the operation panel 26) can be detected.

The size and shape of area A, however, may be changed insofar as area A is an area in front of the image forming apparatus 10 in which a person who can operate the image forming apparatus 10 can be detected. Although detailed description of this is omitted herein, the number of human detection sensors 28 need not be one. Two or more human detection sensors 28 may be used insofar as a person in area A can be detected.

A detectable area of the human detection sensor 28 need not match area A insofar as the detectable area of the human detection sensor 28 includes area A. If there is a fixed obstacle in area A, the obstacle may be excluded in advance from a result of detection.

As illustrated in FIG. 4, if there is a person in area A, the human detection sensor 28 outputs, to the CPU 12, distance data regarding a distance shorter than toe first distance L1. Upon receiving (obtaining) the distance data regarding the distance shorter than the first distance L1, the CPU 12 determines that there is a person in area A. If there is no person in area A, the human detection sensor 28 outputs, to the CPU 12, distance data regarding a distance longer than the first distance L1. Upon receiving the distance data regarding the distance longer than the first distance L1, the CPU 12 determines that there is no person in area A.

Although detailed description of this is omitted herein, if the CPU 12 receives distance data regarding a distance equal to the first distance L1, the CPU 12 determines that there is a person in area A in the first embodiment. Alternatively, the CPU 12 may determine that there is no person in area A.

In addition, although detailed description of this is omitted herein, if the CPU 12 receives distance data regarding a distance shorter than the first distance L1 after receiving distance data regarding a distance longer than the first distance L1, the CPU 12 determines that a person has entered area A. If the CPU 12 receives distance data regarding a distance lancer than the first distance L1 after receiving distance data regarding a distance shorter than the first distance L1, the CPU 12 determines that a person has gone out of area A.

The communication circuit 44 is used to connect to a network such as the Internet. The communication circuit 44 is a wired or wireless communication circuit and communicates with an external computer through a network in accordance with an instruction from the CPU 12.

The electrical configuration of the image forming apparatus 10 illustrated in FIG. 2 is an example, and the electrical configuration of the image forming apparatus 10 is not limited to this.

In the image forming apparatus 10 having such a configuration, a display state of the display 22 switches in accordance with an operation state of the image forming apparatus 10 or the like. When the image forming apparatus 10 has not been operated for a first certain period of time (e.g., 30 to 60 seconds), for example, the backlight 22b turns off and the display 22 enters an off state (non-display state). When the display 22 has entered the off state, the display 22 does not display various screens or software keys.

If a person (hereinafter referred to as a "user") who uses the image forming apparatus 10 presses one of the operation buttons 26a with the display 22 in the off state, or if the user touches the touch panel 20, for example, the backlight 22b turns on. When the backlight 22b has turned on, the display 22 enters an on state and displays one of the various screens or software keys.

Since the display 22 of the image forming apparatus 10 remains in the off state until the user performs an operation, however, the user might think that the image forming apparatus 10 has not been activated (has not been turned on) or has gone wrong. That is, the user might not appropriately recognize that the image forming apparatus 10 has been activated. In order to make the user appropriately recognize that the image forming apparatus 10 has been activated, for example, the display 22 may enter the on state if it is determined that there is a person in area A. In this case, however, the display 22 undesirably enters the on state even while a person (hereinafter referred to as a "passerby") who does not use the image forming apparatus 10 is just passing by the image forming apparatus 10. The display 22 might frequently enter the on state even while the image forming apparatus 10 is not used, and give passersby unpleasant or uncomfortable feelings. In addition, power supplied to the image forming apparatus 10 is also not appropriately controlled.

In the first embodiment, in order to make the user appropriately recognize that the image forming apparatus 10 has been activated without giving passersby unpleasant or uncomfortable feelings, the luminance (brightness) of the display 22 is changed stepwise in accordance with presence or absence of the user in front of the image forming apparatus 10 and the operation state of the image forming apparatus 10. More specifically, the display 22 of the image forming apparatus 10 according to the first embodiment has the off state, a first on state, in which the luminance of the display 22 (liquid crystal panel 22a) becomes equal to or lower than a certain value (first level of luminance), and a second on state, in which the luminance of the display 22 becomes higher than in the first on state.

In the first embodiment, the luminance of the display 22 is controlled (changed) by changing the amount of light emitted from the backlight 22b. The amount of light emitted from the backlight 22b is controlled (changed) by the light control unit 18b in accordance with an instruction from the CPU 12.

As a method for changing the amount of light emitted from the backlight 22b, for example, a pulse-width modulation (PWM) light control method, an area light control method, a current value adjusting light control method, or the like may be used.

In the PWM light control method, the light sources included in the backlight 22b periodically blink. By changing a time ratio (duty ratio) of an on period to an off period, the amount of light emitted from the backlight 22b is changed. When the PWM light control method is used, the light control unit 18b changes the time ratio of the on period to the off period for the light sources in accordance with an instruction from the CPU 12. In this case, the amount of light emitted from the backlight 22b increases as the on period of the light sources becomes long relative to the off period. The amount of light emitted from the backlight 22b decreases as the on period of the light sources becomes short relative to the off period.

In the area light control method, a plurality of unit light sources (e.g., LEDs) included in the backlight 22b are divided into different groups corresponding to predetermined areas. By controlling the number of unit light sources to be turned on among the plurality of light sources included in each area, the amount of light emitted from the backlight 22 is changed. When the area light control method is used, the light control unit 18b changes the number of unit light sources to be turned on in each area in accordance with an instruction from the CPU 12. In this case, the amount of light emitted from the backlight 22b increases as the number of unit light sources to be turned in each area increases. The amount of light emitted from the backlight 22b decreases as the number of unit light sources to be turned on in each area decreases.

In the current value adjusting light control method, the amount of light emitted from the backlight 22b is changed by changing a value of driving current supplied to the LEDs included in the backlight 22b. When the current value adjusting light control method is used, the light control unit 18b changes the value of the driving current supplied to the light sources included in the backlight 22b in accordance with an instruction from the CPU 12. In this case, the amount of light emitted from the backlight 22b increases as the value of the driving current supplied to the light sources included in the backlight 22b increases. The amount of light emitted from the backlight 22b decreases as the value of the driving current supplied to the light sources included in the backlight 22b decreases.

The luminance of the display 22 changes in accordance with not only the amount of light emitted from the backlight 22b but also the light transmittance of the liquid crystal panel 22a. Even when the amount of light emitted from the backlight 22b remains the same, the luminance of the display 22 increases if the light transmittance of the liquid crystal panel 22a is high, and decreases if the light transmittance of the liquid crystal panel 22a is low. When the luminance of the display 22 is to be changed, therefore, the amount of light emitted from the backlight 22b may be changed and/or the light transmittance of the liquid crystal panel 22a may be controlled. In this case, the light control unit 18b controls the display control unit 18a in such a way as to change the light transmittance of the liquid crystal panel 22a in accordance with an instruction from the CPU 12.

The luminance of the display 22 also changes depending on an image (screen) displayed on the display 22. Even when the amount of light emitted from the backlight 22b and the light transmittance of the liquid crystal panel 22a remain the same, for example, the luminance of the display 22 differs between a white image, a gray image, and a black image. When an image mainly including bright colors (e.g., the white image) is displayed on the display 22, the luminance of the display 22 becomes high, and when an image mainly including dark colors (e.g., the black image), the luminance of the display 22 becomes low. When the luminance of the display 22 is to be changed, therefore, the amount of light emitted from the backlight 22b may be changed and/or an image to be displayed on the display 22 may be changed. In this case, a plurality of home screens are prepared in which software keys and messages included are the same but background colors are different from one another. For example, a home screen whose background is dark and a home screen whose background is bright are prepared. The light control unit 18b sets the dark home screen or the bright home screen by controlling the display control unit 18a in accordance with an instruction from the CPU 12.

As described above, in the first on state according to the first embodiment, the luminance of the display 22 becomes equal to or lower than the first level of luminance. At this time, the amount of light emitted from the backlight 22b is controlled such that the luminance of the display 22 becomes equal to or lower than the first level of luminance. In the first on state, for example, the amount of light emitted from the backlight 22b is set to half a maximum value (100%) or smaller (50% or less). In the first on state, therefore, the luminance of the display 22 becomes half a highest level of luminance (100%) or lower (50% or less). The first level of luminance, however, may be any value insofar as the user can recognize that the image forming apparatus 10 has been activated. The luminance of the di-play 22 in the first on state, therefore, need not be 50% or less and may be more than 50%.

In the second on state, the luminance of the display 22 is set to a level (second level of luminance) higher than the first level of luminance. At this time, the amount of light emitted from the backlight 22b is controlled such that the luminance of the display 22 becomes the second level of luminance. In the second on state, for example, the amount of light emitted from the backlight 22b is set to the maximum value (100%). The luminance of the display 22, therefore, becomes the highest level (100). The luminance of the display 22 in the second on state need not be 100% and may be less than 100%. The second level of luminance may be any value insofar as the user can certainly make various settings and issue printing instructions when the user operates the image forming apparatus 10. The second on state corresponds to a normal on state of a display of an image forming apparatus in an example of the related art.

In the first embodiment, if it is determined that there is a person in area A with the display 22 in the off state, the display 22 is set to (enters) the first on state. In addition, if it is determined that the user has operated the image forming apparatus 10 with the display 22 in the first on state, the display 22 is set to (enters) the second on state. More specifically, if the display 22 is in the off state and it is determined that there is a person in area A, the CPU 12 controls the light control unit 18b such that the display 22 enters the first on state. In this case, the backlight 22b is turned on, and the luminance of the display 22 becomes equal to or lower than the first level of luminance. In addition, if the display 22 is in the first on state and the user has operated the image forming apparatus 10, the CPU 12 controls the light control unit 18b such that the display 22 enters the second on state. In this case, the backlight 22b is controlled such that the luminance of the display 22 becomes the second level of luminance. Furthermore, if the display 22 is in the first on state and the image forming apparatus 10 has not been operated for the first certain period of time, the CPU 12 controls the light control unit 18b such that the display 22 enters the off state. In this case, the backlight 22b is turned off.

When the user operates the image forming apparatus 10, for example, the user operates the touch panel 20 or one of the operation buttons 26a. Operations performed by the user (user operations) include an operation for setting a document on the platen or in the ADF, an operation for opening the document cover 30a, and an operation for removing a sheet from the paper output tray 40.

If a billing device is connected to the image forming apparatus 10, the user operations include an operation for putting money into the billing device and an operation for inserting a prepaid card into the billing device.

If the image forming apparatus 10 includes a connection unit in which a recording medium can be set, the user operations include an operation for setting a recording medium in the connection unit.

The above-described operation of the image forming apparatus 10 is achieved by executing control programs stored in the RAM 14 using the CPU 12. A specific process will be described later with reference to a flowchart.

Figure 5:
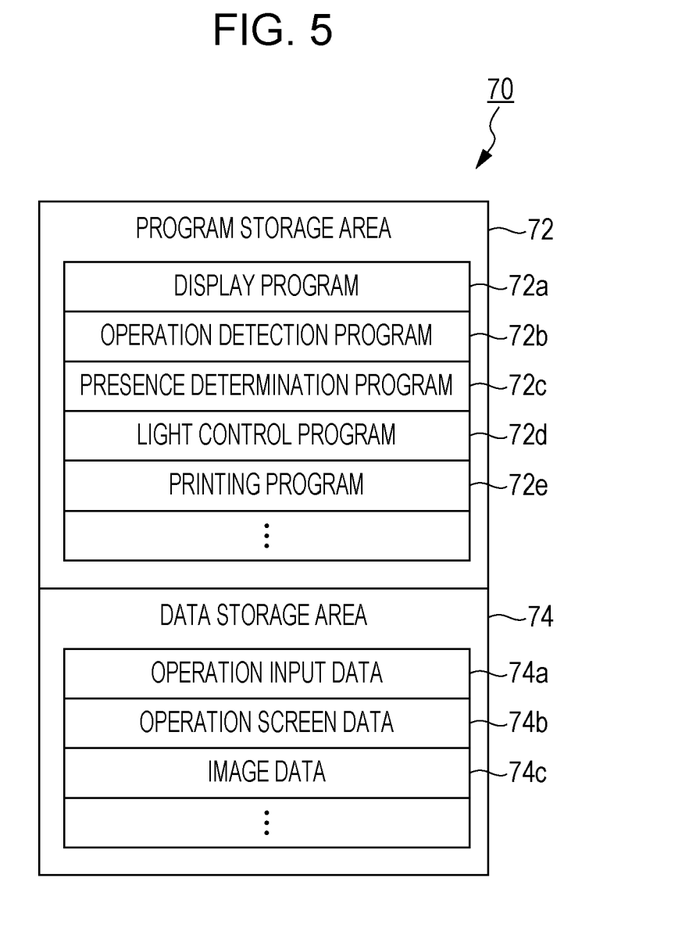
FIG. 5 is a diagram illustrating an example of a memory map of a random-access memory (RAM) illustrated in FIG. 2.

FIG. 5 is a diagram illustrating an example of a memory map 70 of the RAM 14 illustrated in FIG. 2. As illustrated in FIG. 5, the RAM 14 includes a program storage area 72 and a data storage area 74. As described above, the program storage area 72 of the RAM 14 stores the control programs. The control programs include a display program 72a, an operation detection program 72b, a presence determination program 72c, a light control program 72d, and a printing program 72e.

The display program 72a is used to display various screens including an operation screen on the display 22.

The operation detection program 72b is used to detect operations performed on the components of the image forming apparatus 10. The operation detection program 72b is used, for example, to obtain touch coordinate data output from the touch panel 20 and detect an operation performed on a software key included in one of the various screens displayed on the touch panel 20. The operation detection program 72b is also used to detect operations performed on the operation buttons 26a.

The presence determination program 72c is used to obtain distance data output from the human detection sensor 28 and determines whether there is a person in area A in accordance with whether a distance indicated by the distance data is equal to or shorter than a certain distance (the first distance L1 in the first embodiment).

The light control program 72d is used to cause the display 22 to enter the off state, the first on state, or the second on state. The CPU 12 controls the light control unit 18b in accordance with the light control program 72d.

The printing program 72e is used to form a multicolor or monochromatic image on a recording medium (sheet) in accordance with image data 74c or the like, which will be described later.

Although not illustrated, the program storage area 72 also stores programs for selecting and performing various functions.

The data storage area 74 of the RAM 14 stores operation input data 74a, operation screen data 74b, and the image data 74c.

The operation input data 74a is, for example, touch coordinate data and/or operation data detected (obtained) using the operation detection program 72b. The detected touch coordinate data and/or operation data are chronologically stored.

The operation screen data 74b is image data regarding the various operation screens such as the home screen displayed on the display 22.

As described above, the image data 74c is, for example, image data read from a document using the image reading unit 30 or image data input from the outside.

Although not illustrated, the data storage area 74 also stores other pieces of data for executing the control programs and is provided with a timer (counter) and a register for executing the control programs.

Figure 6:
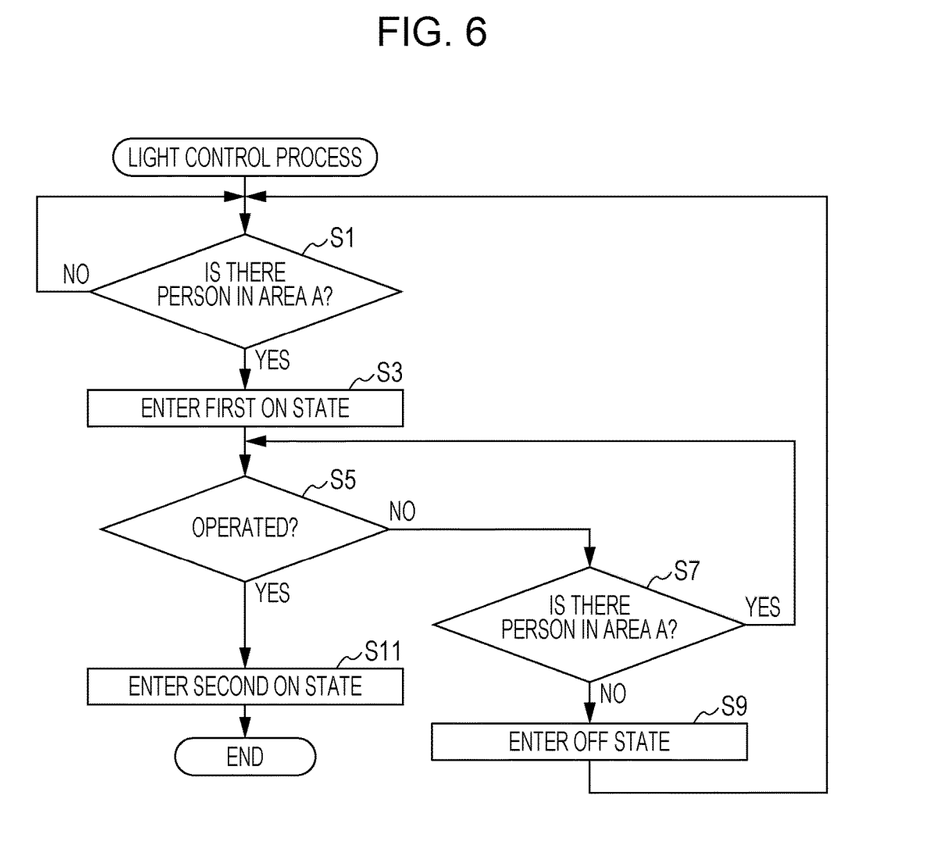
FIG. 6 is a flowchart illustrating an example of a light control process performed by the image forming apparatus illustrated in FIG. 1.

FIG. 6 is a flowchart illustrating an example of a light control process performed by the image forming apparatus 10 illustrated in FIG. 1. The light control process is performed with the display 22 in the off state.

As illustrated in FIG. 6, the CPU 12 starts the light control process and determines in step S1 whether there is a person in area A. If a result of steps S1 is NO, that is, if the CPU 12 determines that there is no person in area A, the CPU 12 returns to step S1. If the result of step S1 is YES, that is, if the CPU 12 determines that there is a person in area A, the CPU 12, in step S3, causes the display 22 to enter the first on state, and proceeds to step S5.

In step S5, the CPU 12 determines whether the image forming apparatus 10 has been operated. If a result of step S5 is NO, that is, if the CPU 12 determines that the image forming apparatus 10 has not been operated, the CPU 12, in step S7, determines whether there is a person in area A. If a result of step S7 is YES, that is, it the CPU 12 determines that there is a person in area A, the CPU 12 returns to step S5. If the result of step S7 is NO, that is, if the CPU 12 determines that there is no person in area A, on the other hand, the CPU 12, in step S9, causes the display 22 to enter the off state, and returns to step S1.

If the result of step S5 is YES, that is, if the CPU 12 determines that the image forming apparatus 10 has been operated, the CPU 12, in step S11, causes the display 22 to enter the second on state, and ends the light control process.

According to the first embodiment, if the display 22 is in the off state and the user approaches the image forming apparatus 10 and enters area A, the display 22 enters the first on state. At this time, because the user pays attention to the display 22, the user can recognize that the image forming apparatus 10 has been activated even if the luminance of the display 22 is low. The user can therefore appropriately recognize that the image forming apparatus 10 has been activated.

In addition, according to the first embodiment, because a passerby who just passes by the image forming apparatus 10 does not pay attention to the display 22, the passerby hardly notices that the display 22 has been turned on if the luminance of the display 22 is low. In addition, since the passerby just passes by the image forming apparatus 10, the passerby does not operate the image forming apparatus 10 or stay inside area A. When a passerby passes by the image forming apparatus 10, therefore, the display 22 enters the first on state but then returns to the off state without entering the second on state. As a result, power is not wasted.

In addition, the image forming apparatus 10 may include an illumination sensor that detects brightness therearound and adjust the luminance of the display 22 in the first on state and the second on state in accordance with the brightness therearound. If the brightness around the image forming apparatus 10 is higher than a certain value, for example, the image forming apparatus 10 may increase the luminance of the display 22 in the first on state and the second on state by several percent. If the brightness around the image forming apparatus 10 is lower than the certain value, on the other hand, the image forming apparatus 10 decreases the luminance of the display 22 in the first on state and the second on state by several percent. The luminance of the display 22 can thus be appropriately controlled in consideration of the brightness around the image forming apparatus 10.

Second Embodiment

An image forming apparatus 10 according to a second embodiment is the same as the image forming apparatus 10 according to the first embodiment except that the display 22 does not enter the off state from the second on state if the image forming apparatus 10 has not been performed for the first certain period of time and there is a person in area A. Differences from the first embodiment will be mainly described, and description of the same elements is omitted or will be simplified.

With the image forming apparatus 10 according to the second embodiment, the display 22 enters the first on state from the second on state if the image forming apparatus 10 has not been operated for the first certain period of time and there is a person in area A. If there is no longer a person in area A after the display 22 enters the first on state, that is, if a person gets out of area A, the display 22 enters the off state.

When there is no longer a person in area A even before the image forming no apparatus 10 enters the first on state, the display 22 may directly enter the off state from the second on state if the image forming apparatus 10 has not been operated for the first certain period of time.

Figure 7:
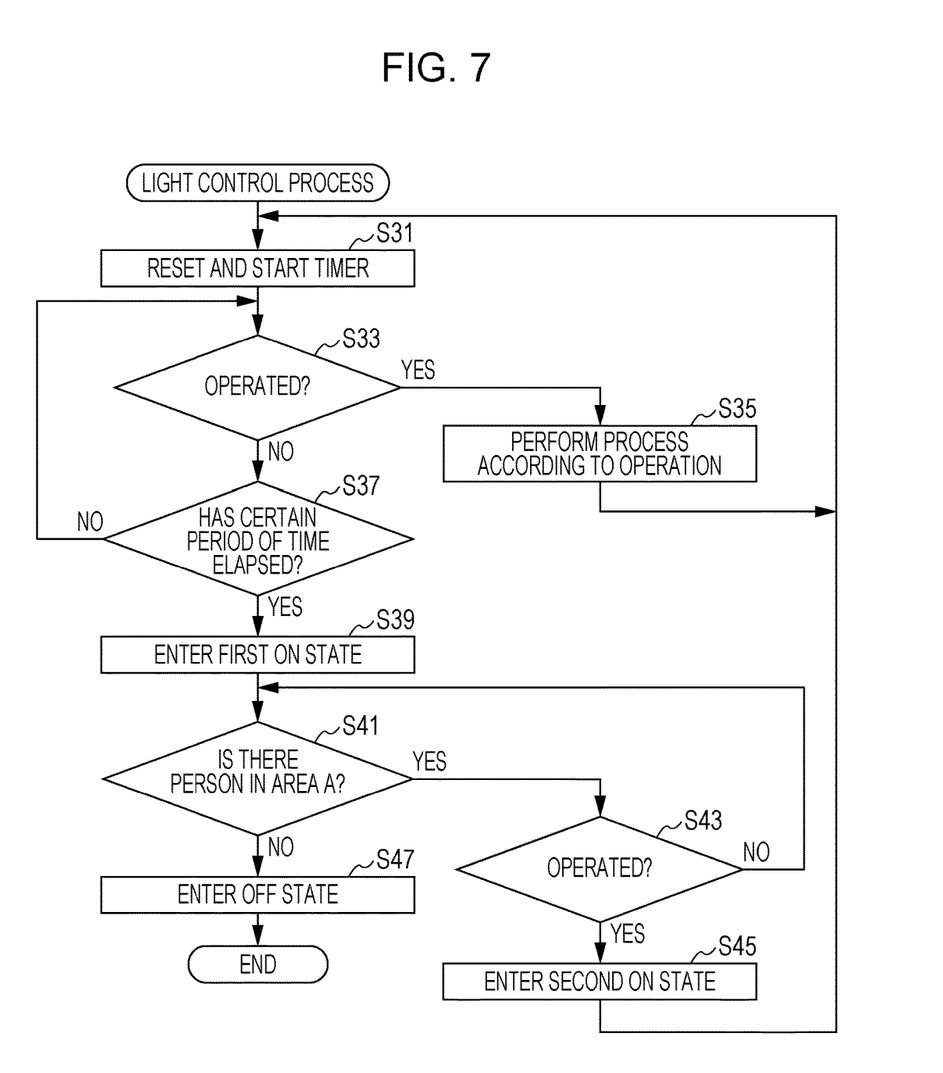
FIG. 7 is a flowchart illustrating an example of a light control process according to a second embodiment.

FIG. 7 is a flowchart illustrating an example of a light control process according to the second embodiment. The light control process performed by the CPU 12 in the second embodiment will be described hereinafter with reference to the flowchart of FIG. 7. The light control process according to the second embodiment is performed after the display 22 enters the second on state.

As illustrated in FIG. 7, the CPU 12 starts the light control process and, in step S31, resets and starts the timer. In step S33, the CPU 12 determines whether the image forming apparatus 10 has been operated. The timer begins to count time when the display 22 enters the second on state. Although not illustrated, the timer is provided inside the image forming apparatus 10 (the CPU 12 or the RAM 14).

If a result of step S33 is YES, that is, if the CPU 12 determines that the image forming apparatus 10 has been operated, the CPU 12, in step S35, performs a process, such as making settings or issuing a printing instruction, in accordance with the operation and returns to step S31. If the result of step S33 is NO, that is, if the CPU 12 determines that the image forming apparatus 10 has not been operated, on the other hand, the CPU 12, in step S37, determines whether the first certain period of time has elapsed since the timer started in step S31.

If a result of step S37 is NO, that is, if the first certain period of time has not elapsed since the timer started in step S31, the CPU 12 returns to step S33. If the result of step S37 is YES, that is, if the first certain period of time has elapsed since the timer started in step S31, on the other hand, the CPU 12, in step S39, causes the display 22 to enter the first on state, and proceeds to step S41. In step S41, the CPU 12 determines whether there is a person in area A.

If a result of step S41 is YES, that is, if the CPU 12 determines that there is a person in area A, the CPU 12, in step S43, determines whether the image forming apparatus 10 has been operated. If a result of step S43 is NO, the CPU 12 returns to step S41. If the result of step S43 is YES, the CPU 12, in step S45, causes the display 22 to enter the second on state, and returns to step S31.

If the result of step S41 is NO, that is, if the CPU 12 determines that there is no person in area A, the CPU 12, in step S47, causes the display 22 to enter the off state, and ends the light control process.

According to the second embodiment, even if the image forming apparatus 10 has not been operated for the first certain period of time, the display 22 does not enter the off state insofar as the user is located close to the image forming apparatus 10. The user can therefore recognize that the image forming apparatus 10 has been activated.

Third Embodiment

A third embodiment is the same as the first embodiment except that the image forming apparatus 10 enters the power saving mode or the normal mode depending on whether the display 22 has entered the off state, the first on state, or the second on state. Differences from the first embodiment will be mainly described, and description of the same elements is omitted or will be simplified.

Although not described in the first embodiment, a power control circuit is connected to the CPU 12 through the bus 60. The power control circuit is used to supply power to the components of the image forming apparatus 10 in accordance with an instruction from the CPU 12. The power control circuit decreases and rectifies commercial power and supplies or stops a certain direct current voltage according to each component in accordance with an instruction from the CPU 12.

The CPU 12 controls a power supply state (operation state) of the image forming apparatus 10 by controlling the power control circuit. In the normal mode, for example, the CPU 12 supplies power to all the components of the image forming apparatus 10.

In the image forming apparatus 10, for example, a second certain period of time (e.g., 20 to 30 seconds) for switching from the normal mode to the power saving mode is set in advance. If one of the operation buttons 26a or the touch panel 20 has not been operated for the second certain period of time in the normal mode, the image forming apparatus 10 automatically switches from the normal mode to the power saving mode.

In the power saving mode, if the user operates the image forming apparatus 10, the image forming apparatus 10 automatically switches from the power saving mode to the normal mode.

The power saving mode may include two types of power saving mode in which power consumption is different from each other. In this case, the power saving mode includes a first power saving mode (first power saving state) and a second power saving mode (second power saving state), in which power consumption is larger than that in the first power saving mode. That is, the image forming apparatus 10 includes three types of operation state, namely the normal mode, the first power saving mode, and the second power saving mode.

When the image forming apparatus 10 has the three types of operation state, for example, the power consumption of the image forming apparatus 10 is equal to or smaller than a first power value in the first power saving mode. In the second power saving mode, the power consumption of the image forming apparatus 10 becomes equal to or smaller than a second power value, which is larger than the first power value. The second power value, however, is smaller than the power consumption of the image forming apparatus 10 in the normal mode. In the second power saving mode, for example, power is supplied to some components to which power is not supplied in the first power saving mode. That is, when the image forming apparatus 10 has time three types of operation state, the CPU 12 controls the power control circuit in such a way as to supply power thereto and to the power saving key, the operation button detection circuit 24, and relevant sensors, as well as the fixing device of the image forming unit 32, the entirety of the operation panel 26 including the power saving key, and the like.

The image forming apparatus 10 according to the third embodiment enters the power saving mode or the normal mode depending on whether the display 22 has entered the off state, the first on state, or the second on state. That is, the operation state of the image forming apparatus 10 according to the third embodiment is set in accordance with the display state of the display 22.

Figure 8:
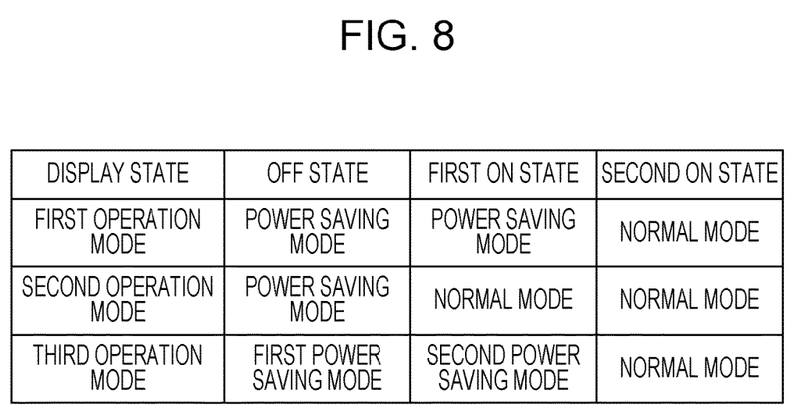
FIG. 8 is a table indicating a relationship between a display state of a display and an operation state of an image forming apparatus in a third embodiment.

FIG. 8 is a table indicating a relationship between the display state of the display 22 and the operation state of the image forming apparatus 10 in the third embodiment. The table of FIG. 8 indicates a case in which the image forming apparatus 10 has two types of operation state (a first operation mode and a second operation mode) and a case in which the image forming apparatus 10 has three types of operation state (third operation mode).

As illustrated in FIG. 8, for example, when the image forming apparatus 10 has the two types of operation state (the first operation mode and the second operation mode), the image forming apparatus 10 enters the power saving mode if the display 22 is in the off state. When the image forming apparatus 10 has the three types of operation state (third operation mode), the image forming apparatus 10 enters the first power saving mode, in which power consumption is the smallest, if the display 22 is in the off state.

When the image forming apparatus 10 has the two types of operation state, the image forming apparatus 10 may enter the power saving mode (first operation mode) or may enter the normal mode (second operation mode) if the display 22 is in the first on state. When the image forming apparatus 10 has the three types of operation state, the image forming apparatus 10 enters the second power saving mode if the display 22 is in the first on state.

If the display 22 is in the second on state, the image forming apparatus 10 enters the normal mode in any of the operation modes.

According to the third embodiment, the image forming apparatus 10 enters the power saving mode or the normal mode depending on whether the display 22 has entered the off state, the first on state, or the second on state. As a result, the user can appropriately recognize that the image forming apparatus 10 has been activated. Power can be appropriately controlled and is not wasted.

The third embodiment may be combined with the second embodiment.

The specific values, the configuration of the screens, and the like mentioned in the above embodiments are examples, and may be changed in accordance with actual products.

Furthermore, the order of the steps in the flowcharts referred to in the above embodiments may be changed insofar as the same results are produced.

The present disclosure contains subject matter related to that disclosed in Japanese Priority Patent Application JP 2016-149126 filed in the Japan Patent Office on Jul. 29, 2016, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An image forming apparatus comprising:
 a processor comprising:
  a display unit;
   a presence determination unit that determines whether there is a person in an area set around the image forming apparatus;
   an operation determination unit that determines whether the image forming apparatus has been operated; and
   a light controlling unit that, if the presence determination unit determines that there is a person in the area with the display unit in an off state, establishes a first on state or a second on state, wherein luminance of the display unit is controlled by (i) an amount of light emitted from a backlight, (ii) a light transmittance of a liquid crystal panel, or (iii) an image displayed on the display.

2. The image forming apparatus according to claim 1, wherein, if the operation determination unit determines that the image forming apparatus has not been operated for a certain period of time with the display unit in the second on state, the light control unit establishes the first on state, and if the presence determination unit determines that there is no person in the area with the display unit in the first on state, the light control unit establishes the off state.

3. The image forming apparatus according to claim 1, further comprising:

a light emission unit that illuminates the display unit, wherein the light control unit turns off the light emission unit in the off state, limits an amount of light emitted from the light emission unit to a certain value or smaller in the first on state, and sets, in the second on state, the amount of light emitted from the light emission unit to be larger than in the first on state.

4. The image forming apparatus according to claim 1, wherein the image forming apparatus has a power saving state, in which power consumption becomes equal to or smaller than a certain value, and a normal state, in which the power consumption is not limited, the image forming apparatus further comprising:

a power control unit that establishes the power saving state or the normal state depending on whether the light control unit has established the off state, the first on state, or the second on state.

5. A control program computer-executable control program stored in a non-transitory computer readable storage medium for an image forming apparatus including a display unit, the computer-executable control program stored in a non-transitory computer readable storage medium causing a computer of the image forming apparatus to function as:

a presence determination unit that determines whether there is a person in an area set around the image forming apparatus;

an operation determination unit that determines whether the image forming apparatus has been operated; and a light controlling unit that, if the presence determination unit determines that there is a person in the area with the display unit in an off state, establishes a first on state or a second on state, wherein luminance of the display unit is controlled by (i) an amount of light emitted from a backlight, (ii) a light transmittance of a liquid crystal panel, or (iii) an image displayed on the display.

6. A method for controlling an image forming apparatus including a display unit, a computer of the image forming apparatus performing operations comprising:

(a) determining whether there is a person in an area set around the image forming apparatus;

(b) determining whether the image forming apparatus has been operated; and (c) establishing, if it is determined in (a) that there is a person in the area with the display unit in an off state, a first on state or a second on state, wherein luminance of the display unit is controlled by (i) an amount of light emitted from a backlight, (ii) a light transmittance of a liquid crystal panel, or (iii) an image displayed on the display.

* * * * *